United States Patent
Gordon

(10) Patent No.: US 6,450,828 B1
(45) Date of Patent: Sep. 17, 2002

(54) PROJECTING PLUG WITH NON-WIPING CONNECTOR CONTACTS

(75) Inventor: Seth A. Gordon, Eugene, OR (US)

(73) Assignee: Rosen Products LLC, Eugene, OR (US)

( * ) Notice: Subject to any disclaimer, the term of this patent is extended or adjusted under 35 U.S.C. 154(b) by 0 days.

(21) Appl. No.: 09/585,675

(22) Filed: Jun. 1, 2000

(51) Int. Cl.⁷ .............................................. H01R 13/625
(52) U.S. Cl. ...................................... 439/347; 439/700
(58) Field of Search ................................ 439/289, 347, 439/700, 824, 374, 680

(56) References Cited

U.S. PATENT DOCUMENTS

| | | | |
|---|---|---|---|
| 1,711,397 A | * 4/1929 | Rumble | 200/51.1 |
| 2,305,749 A | * 12/1942 | Voigt | 200/61.81 |
| 2,514,655 A | 7/1950 | Luketa | |
| 2,739,292 A | 3/1956 | Modrey et al. | |
| 3,046,513 A | 7/1962 | Crowley | |
| 3,072,374 A | 1/1963 | Bodian | |
| 3,122,407 A | * 2/1964 | Cowe | 439/740 |
| 3,378,810 A | * 4/1968 | Dorrell | 439/436 |
| 3,755,771 A | * 8/1973 | Brush | 439/248 |
| 4,438,458 A | 3/1984 | Münscher | |
| 4,455,008 A | 6/1984 | MacKew | |
| 4,620,808 A | 11/1986 | Kurtin et al. | |
| 4,632,348 A | 12/1986 | Keesling et al. | |
| 4,633,323 A | 12/1986 | Haberkern et al. | |
| 4,647,980 A | 3/1987 | Steventon et al. | |

(List continued on next page.)

Primary Examiner—Khiem Nguyen
Assistant Examiner—Thanh-Tam Le
(74) Attorney, Agent, or Firm—Kolisch, Hartwell, Dickinson, McCormack & Heuser

(57) ABSTRACT

A plug is disclosed that provides for electrically connecting an electronic device, such as a television, to a signal port providing power, ground, audio/video, control and status-reporting signals to and from the device. The signal port is connected to terminals in a receptacle and the plug includes joining structure that can be inserted in or otherwise coupled to the receptacle to mechanically support the plug and the device. The joining structure is provided with retractable contacts to make the electrical connections with the terminals in the receptacle. The retractable contacts avoid damage when the joining structure is inserted into a receptacle that is fouled with debris because the contacts retract on contact with the debris rather than being bent or pushed out of place. The retractable contacts provide hemispherical, partially spherical, elliptical, flat, or other broad surface areas for electrical connection to the terminals, and the terminals may be provided with complementarily shaped and broad surface areas. The complementary shapes and broad surface areas allow for improved electrical connection even if the joining structure and receptacle are not perfectly aligned. The plug may also include an elongate projecting member terminating with first and second ends, with the first end being operatively connected to the joining structure so that the projecting elongate member extends from it and away from the receptacle. A pivot is provided so that the projecting member is articulable in a pivot plane. The projecting member also includes a connector located adjacent its second end for fastening to a housing/support structure for the electronic device.

10 Claims, 6 Drawing Sheets

U.S. PATENT DOCUMENTS

| | | | |
|---|---|---|---|
| D292,264 S | 10/1987 | Staufenberg et al. | |
| 4,708,312 A | 11/1987 | Rohr | |
| 4,734,050 A | * 3/1988 | Negre et al. | 439/289 |
| 4,735,467 A | 4/1988 | Wolters | |
| 4,749,364 A | 6/1988 | Arney et al. | |
| 4,836,486 A | 6/1989 | Vossoughi et al. | |
| 4,982,996 A | 1/1991 | Vottero-Fin et al. | |
| 4,987,690 A | 1/1991 | Aaldenberg et al. | |
| 5,076,524 A | 12/1991 | Reh et al. | |
| 5,092,552 A | 3/1992 | Dayton et al. | |
| D325,868 S | 5/1992 | Bartok | |
| 5,144,290 A | 9/1992 | Honda et al. | |
| 5,177,616 A | 1/1993 | Riday | |
| 5,179,447 A | 1/1993 | Lain | |
| 5,195,709 A | 3/1993 | Yasushi | |
| 5,271,590 A | 12/1993 | Rosen | |
| 5,417,595 A | * 5/1995 | Cullen et al. | 439/700 |
| D360,126 S | 7/1995 | Rosen | |
| 5,611,513 A | * 3/1997 | Rosen | 439/700 |
| 5,850,997 A | 12/1998 | Rosen | |
| 6,070,843 A | 6/2000 | Rosen | |

* cited by examiner

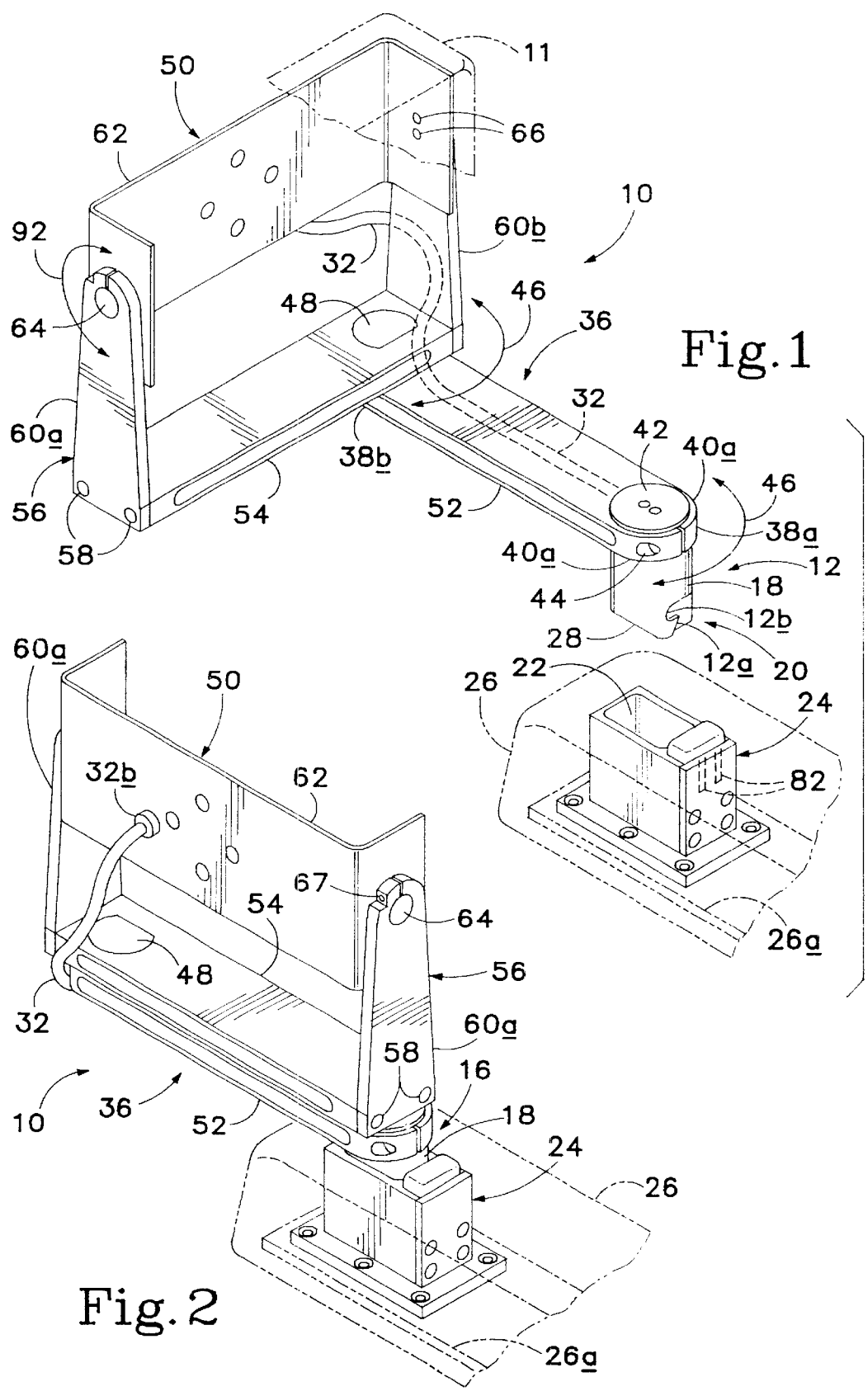

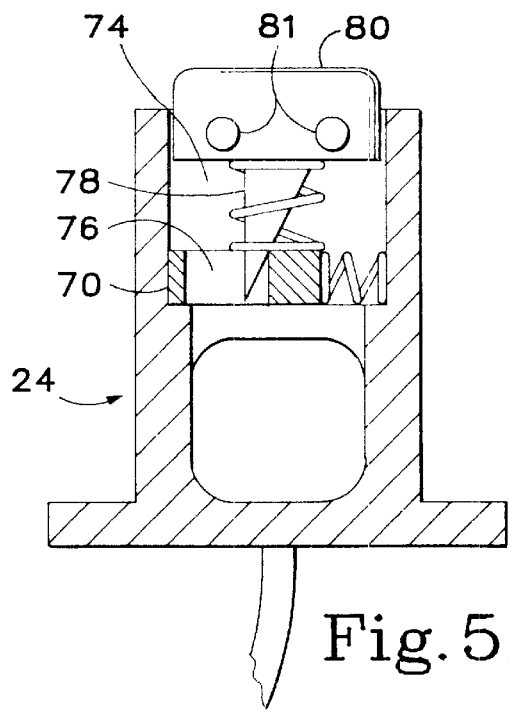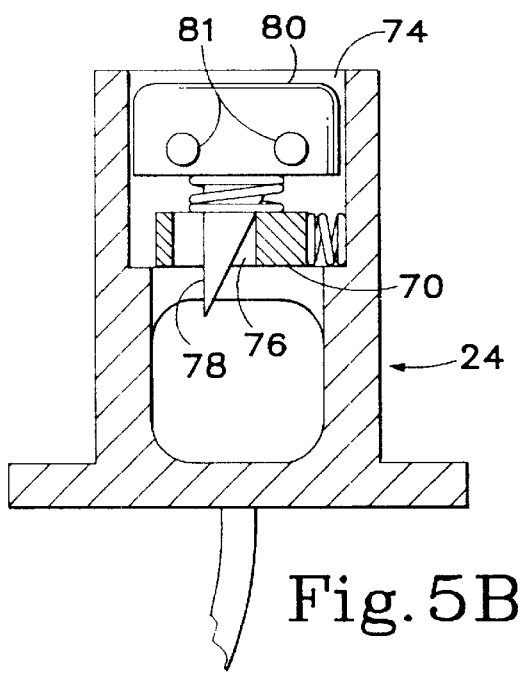
Fig. 5A  Fig. 5B
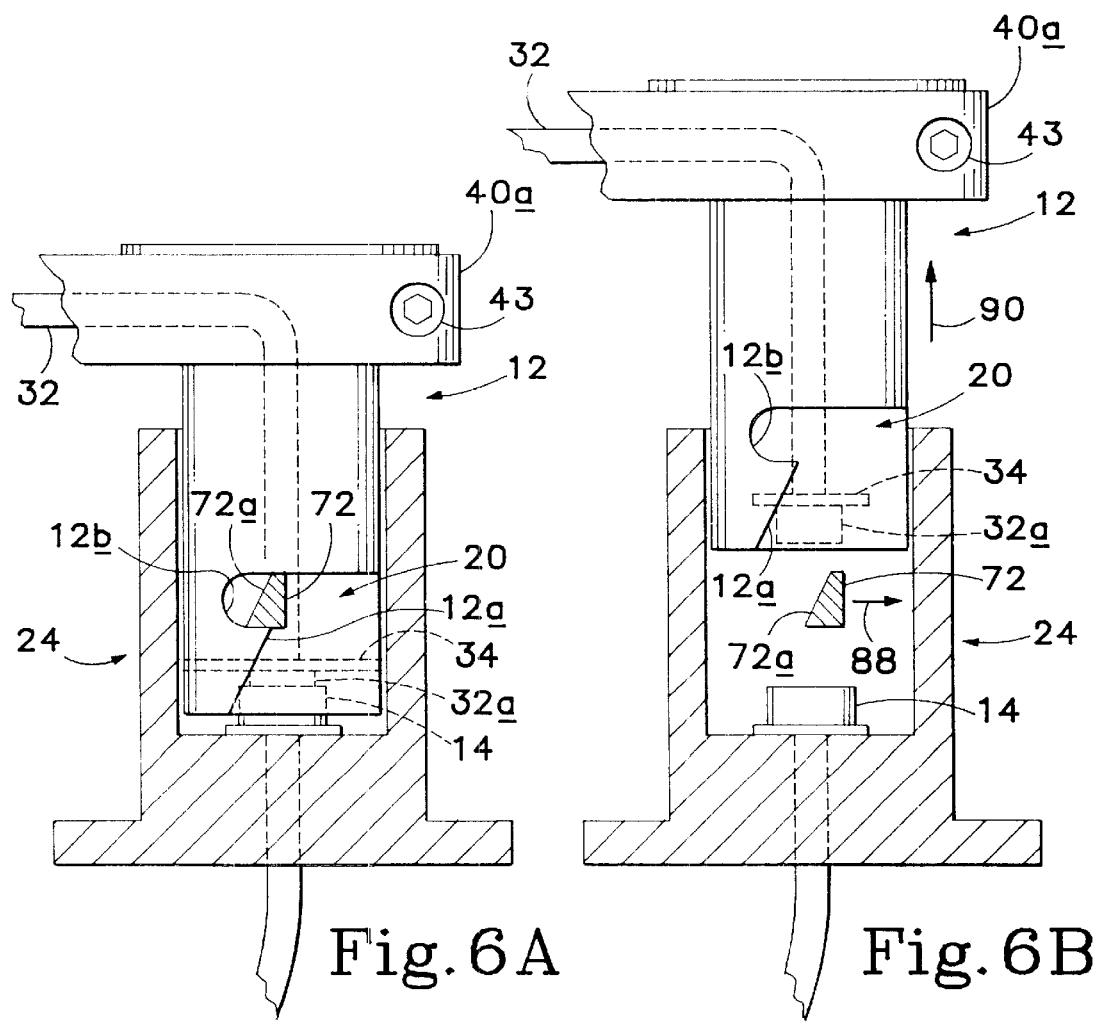
Fig. 6A  Fig. 6B

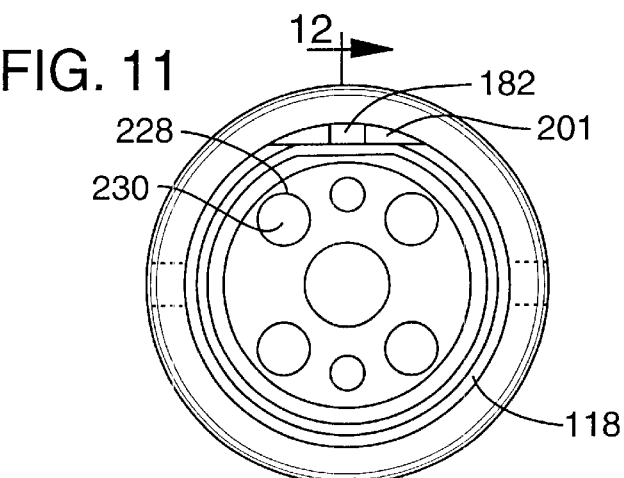
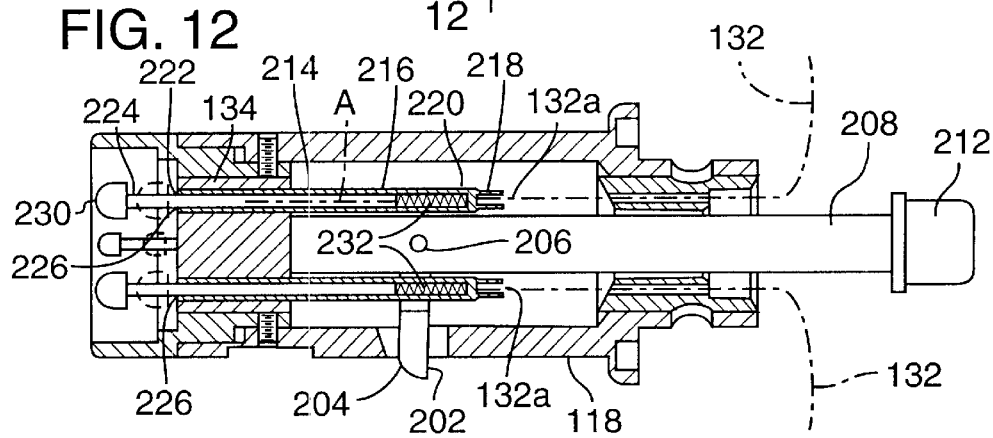
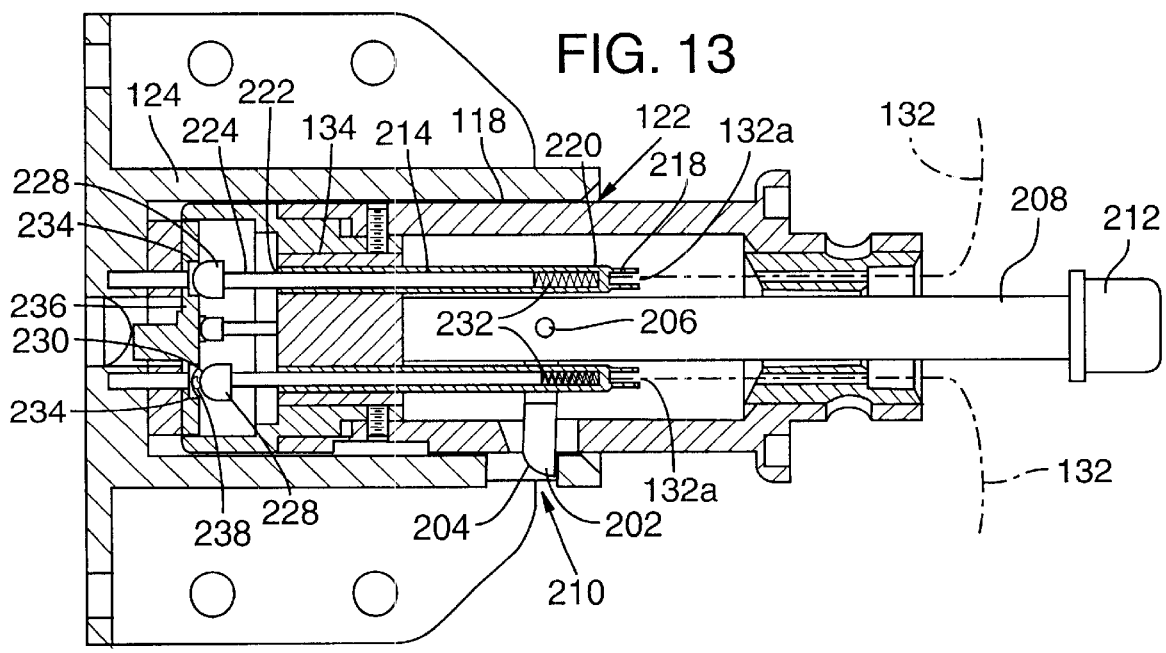

PROJECTING PLUG WITH NON-WIPING CONNECTOR CONTACTS

BACKGROUND OF THE INVENTION

The present invention relates generally to electronic/mechanical connections between an electronic device and an electronic-signal source, and more particularly to a projecting plug for making such connections between a device and a source. The present invention also relates to a plug with contacts that are retractable to provide protection against damage to the pins when inserted into a receptacle that is fouled by debris or with contacts that provide a broad surface area for connection or a self-aligning shape to make a connection even if inserted in a non-aligned manner.

It is desirable for the user of an electronic device that includes a monitor to be able to position selectively the monitor for comfortable viewing angles. Such electronic device may be any of various devices including televisions or computer monitors. When using such a device, the user is normally sitting in a room or some other type of enclosure or compartment. For example, other enclosures may include the cockpit or passenger area of an airplane.

Conventional televisions and computer monitors are usually positioned in preset positions relative to the viewer. Certain conventional systems include a stand on which to place the monitor/television. For the remainder of this description, monitor/television will be referred to simply as a monitor, and it should be understood that by monitor applicant refers to any type of device for displaying audio/visual or visual information to a viewer.

Prior art proposals involving stands for the monitor provide for a certain amount of adjustability including a swivel mechanism or a tilt feature. However, the stand-based systems are designed for use in relatively stationary settings where there is room to place the monitor on a stand, with the stand usually being placed on a desk or table.

For applications where it is impractical or impossible to use a stand and desk/table, the prior art is lacking a device whereby the monitor may be supported and selectively movable to positions providing improved viewing for individual viewers. There is an increasing need for such a capability because of the greater awareness and focus on ergonomics, which is also known as human engineering or human-factors engineering. Essentially, ergonomics is an applied science that coordinates the design of devices and physical working/use conditions with the capacities and requirements of the user.

Focusing on the aforementioned aircraft setting, the physical conditions of the passenger area do not provide a lot of room for movement by the passenger, or for auxiliary furniture such as desks, tables and other platforms. Similarly, pilots and other airline-support personnel occupy work areas, such as the cockpit, that present spaces which are equally, if not more, cramped with minimal room for performing their duties.

In the aircraft setting, such monitors are used by pilots and support personnel in the cockpit and work areas, as well as by passengers in the passenger area. Usually such monitors are fixedly mounted in the interior structure of the aircraft and therefore suffer from the drawback of not being adjustable for individual viewers. In other words, these prior art systems are not ergonomically correct for a wide variety of users.

With respect to the mounting of monitors in the aircraft-passenger area, U.S. Pat. No. 4,647,980 to Steventon et al. proposes a relatively complicated system of mounting television receiver modules in the back of an aircraft passenger seat, such as within the headrest portion of the seat, with the television screen facing backward for viewing by a passenger sitting in the seat immediately behind such headrest. Steventon et al. note that the television screen can be angularly oriented within the chassis at a selected tilt angle that is generally complimentary to the average reclined angle of such passenger seats. Problems with the proposal in Steventon et al. include that the television receiver modules are mounted in a preset, fixed position without allowing for adjustment by individual passengers. In addition, while the receiver modules are removable, the removing procedure is somewhat complicated by multiple plugs, thereby requiring a two-handed mounting operation.

Similar to the limitations of the mounting system in Steventon et al., U.S. Pat. No. 4,982,996 to Vottero-Fin et al. discloses an automotive seating system that includes an armrest of a front seat with an open back end in which is placed a television set. The television screen is viewable by passengers seated in a backseat when the armrest is swung to an operating position that makes the armrest's back end visible to such passengers. The television set is fixedly attached in the armrest and associated mounting members do not allow for selective adjustment of it for improved viewing.

In addition to their drawbacks from an ergonomic point of view, prior art mounting systems like those disclosed in Steventon et al. and Vottero-Fin et al. also fail to provide for multiple positioning of a monitor within a viewing area. These conventional systems are fixedly attached to a specific port and are not easily withdrawn from one port for placement in another.

In settings like the above-mentioned aircraft-passenger area it is desirable to have monitor mounting systems designed so that a given monitor may be plugged into any one of multiple ports located within the passenger area. By using such a mounting system with the recently developed, relatively small flat-screen televisions, airline companies could offer customers an optional, individual television service. Suitable ports could be installed adjacent each passenger seat and airline employees could hand out such televisions with corresponding mounting systems to customers on a fee basis. Such a television service could be provided in the same way that airlines presently offer audio service by handing out headphones to customers who can use them by inserting them in a jack provided in their seat.

SUMMARY OF THE INVENTION

The invention provides an articulable projecting plug that makes a mechanical connection between an electronic signal port and housing/support structure associated with an electronic device, and accommodates electronic communication between a signal source and such device by establishing contact between a first end of a conductor that is connectable with such a device and such port. The plug includes a joining member structured to bring the plug into contact with the port and hold them both in such joined relationship. The joining member includes an outer surface and holder structure for holding the first end of such elongate conductor structure so that joinder of the plug with the port will also result in contact between such first end and the port.

The plug also may include an elongate projecting member terminating with first and second ends, with the first end being operatively connected to the joining member so that the projecting member extends from it and away from the port. A pivot typically is provided so that the elongate projecting member is articulable in a pivot plane. The projecting member also may include a connector located adjacent its second end for fastening to such housing/support structure of the electronic device.

In one embodiment the plug includes a receptacle mounted adjacent the port for receiving the joining member. The receptacle also may include a locking mechanism allowing for secure connection of the joining member with the receptacle. The pivot typically is disposed between the joining member and the elongate projecting member.

In another embodiment, the first end of the conductor held in the joining member terminates in an electrical contact that is movable with respect to the joining member. The electrical contact provides an electrical connection, when the joining member and receptacle are mated, to a terminal, such as a conductive pad in the receptacle that is connected to the electronic signal port.

BRIEF DESCRIPTION OF THE DRAWINGS

FIG. 1 is an isometric view of a projecting plug in a partially open, articulated position holding a flat-screen television, and in an unjoined position with a receptacle that is located in the arm of an aircraft seat.

FIG. 2 is like FIG. 1 except that the projecting plug has been pivoted in the pivot plane to a closed position, and is joined with the receptacle.

FIG. 5A is a side sectional view along line 5—5 of FIGS. 3 and 4 showing portions of the locking mechanism with the mechanism in a locked position.

FIG. 5B is like FIG. 5A except that the locking mechanism is in an unlocked position.

FIG. 6A is a side sectional view along line 6—6 of FIGS. 3 and 4 showing the joining member in the receptacle with the locking mechanism in a locked position.

FIG. 6B is like FIG. 6A except that the locking mechanism is in an unlocked position and the joining member is being removed from the receptacle.

FIG. 11 is a bottom plan view of the joining member showing six retractable contacts with a generally hemispherical contact surface area, and of two different sizes, the six contacts accommodating, e.g., power and ground, audio/visual signal and return, and other desired signal/power functions.

FIG. 12 is a cross-sectional side view of the joining member showing the retractable contacts, each provided at a distal end of a probe anchored in the joining member, each probe including an outer cylinder in which is movably mounted a piston that extends out a distal end of the cylinder, the pistons culminating in the contacts, and a spring within the cylinder that biases the contacts to a nominal position shown in solid line, and allowing the contacts to be retracted to a retracted position shown in dashed line, the figure also showing a knob atop a control rod that can be pulled upward to release the locking mechanism for removal of the joining member from the receptacle.

FIG. 13 is a cross-sectional side view of the joining member and the receptacle mechanically connected to one another and held together by the locking mechanism, including a latch on the joining structure extending through a hole in the receptacle, the view also showing two contacts of the joining structure retracted from the extended position, one to a normal position on the associated contact pad in the receptacle, the other retracted further because it has come into contact with a piece of debris resting on its associated contact pad.

DETAILED DESCRIPTION OF THE DEPICTED EMBODIMENTS

Figure 3:
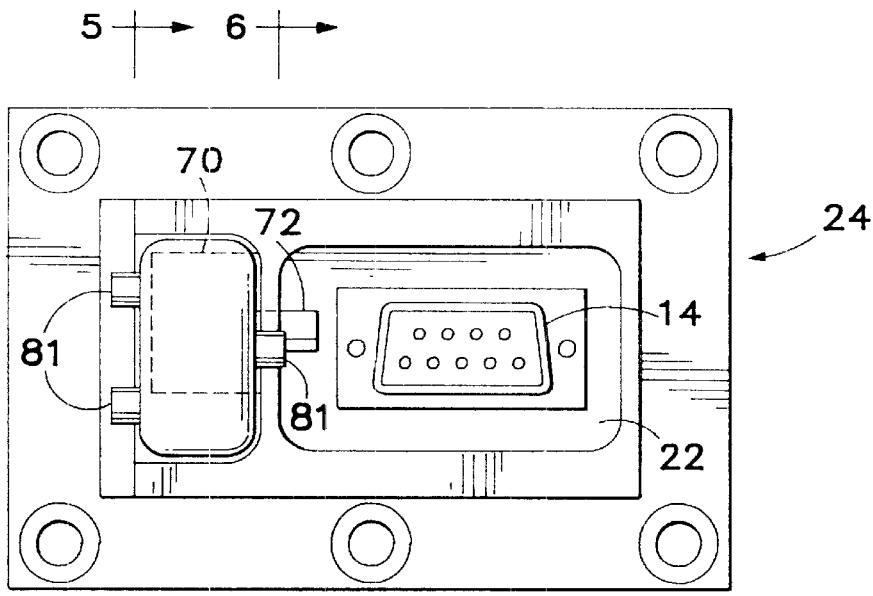
FIG. 3 is a top view of the receptacle showing a video-signal port and a locking mechanism.

Referring now to the drawings, FIGS. 1 and 2 show the articulable projecting plug of the present invention at 10 for holding a monitor such as a flat-screen television, a fragmentary section of which is shown by dashed lines 11. The term monitor is meant to refer to any display for an electronic or avionic device which is capable of displaying audio/visual or visual information. Plug 10 includes joining structure 12 constructed to bring the plug into contact with an electronic/video port such as jack 14 (FIG. 3) and hold them both in a joined relationship like that shown at 16 in FIG. 2.

Still referring to FIGS. 1 and 2, joining structure 12 includes an outer surface 18 in which a recess 20 is formed for use in connection with a to-be-described locking mechanism for holding releasably joining structure 12 in a space 22 defined by a receptacle 24. For future reference, the reader should note that joining structure 12 includes sloping edge 12a and curved edge 12b, the significance of which will become apparent after referring to the description of the locking mechanism provided below. As shown in FIGS. 1 and 2, receptacle 24 is placed in an open hole of an arm 26 of an aircraft seat (undepicted). Receptacle 24 is operatively connected to a frame member 26a. Typically, the receptacle is fixedly positioned so that it is flush with the top surface of arm 26 and it may be covered with a suitable hinged cover (undepicted). It should be understood that receptacle 24 could be positioned in any interior wall or other structure adjacent the viewing area, and could be pivotably mounted to the structure.

Referring to FIGS. 1–3 and 6A–6B, joining structure 12 includes a lead end 28 which is joinable with jack 14 and encloses a first end 32a (FIGS. 6A–6B) of conductor 32. Joining structure 12 also includes holder structure 34 for holding first end 32a so that joinder of plug 10 with jack 14 by placing it into space 22 of receptacle 24 will result in contact between first end 32a and jack 14.

Referring to the left of joining structure 12 in FIG. 1, plug 10 also includes elongate projecting structure 36 with first and second ends 38a, 38b. First end 38a is pivotedly connected to joining structure 12 using suitable means. For example, end 38a may be formed with arcuate arms 40a, b which are fittable around a bearing 42 which is rotatably positioned in the end of joining structure 12 that is opposite lead end 28. Arms 40a, 40b may be tightened around bearing 42 by actuating a fastener such as turning an allen screw 43 (FIGS. 6A–6B) which is positioned in a hole 44 formed in arm 40a and extendable into a threaded bore (undepicted) formed in arm 40b.

Still referring to FIG. 1, projecting structure 36 is articulable bidirectionally, as shown by arrows at 46, typically in a pivot plane that is substantially normal to the long axis joining structure 12. It should be understood that modifications to the pivotable connection between the airplane, receptacle 24, projecting structure 36 and joining structure 12 would make it possible to select a variety of pivot planes and it is by no means a requirement of the invention that the pivot plane be substantially normal to the long axis of joining structure 12, nor that joining structure 12 pivot relative to projecting structure 36.

Referring to the left side of projecting structure 36 in FIG. 1, second end 38b is provided with a connector such as a bearing 48 which is rotatably positionable in it. The top of bearing 48 is rotatably positionable in a suitable bole formed in housing/support structure 50. Housing/support structure 50 may be thought of as being part of projecting structure 36 so that projecting structure 36 could be said to include a first elongate projecting member 52 and a second elongate projecting member 54. Second projecting member 54 includes a connector for attaching to upright support structure 56 and such a connector may take the form of one or more screws, two of which are shown at 58 in FIG. 1.

Still referring to FIGS. 1 and 2, upright support structure 56 is typically formed with two upright arms 60a, b and a tilt bracket 62 opposite ends of which are pivotably attached to the upright arms using suitable means such as bearings, one of which is shown at 64. The bearings are attachable to bracket 62 using suitable fasteners such as screws 66, and are attachable to arms 60a, b using fasteners such as allen screw 67 (FIG. 2).

FIGS. 1 and 2 show an embodiment of the present invention that is designed for mounting on the right side of a user. However, it should be understood that plug 10 could be easily converted for left-side mounting by simply detaching bracket 62 from arms 60a, b, turning it 180°, and reattaching it to the arms.

Still referring to FIG. 1, tilt bracket 62 is pivotable selectively in a plane different from the pivot plane to allow the user to selectively adjust, or tilt, the monitor for improved and ergonomically correct viewing.

Referring back to FIG. 1, conductor 32 may be positionable inside plug 10 with first end 32a held by holder structure 34 and its second end 32b projecting out of projecting structure 36 for connection to television 11. (In FIG. 2, second end 32b is shown oriented generally for such connection, with end 32b being freely movable to make such connection with television 11 (not shown in FIG. 2), as between bracket 62 and member 54). Such positioning is made possible by forming an open channel in both joining structure 12 (see conductor 32 placed in such channel in FIGS. 6A–6B) and in projecting structure 36 (see conductor 32 in such channel in FIG. 1 and exiting such channel in FIG. 2).

Referring now to FIGS. 3–6B, a locking mechanism for releasably locking joining structure 12 in receptacle 24 will now be discussed. A typical locking mechanism is shown generally at 68 and includes a laterally disposed bar 70 that is formed with a protrusion 72 which extends into space 22.

Referring to FIGS. 5A–5B, bar 70 is positionable in an open section 74 formed in receptacle 24. Bar 70 is also formed with an opening 76 for receiving a wedge 78 that extends downwardly from, and is attached to, a pushbutton 80. As perhaps best shown in FIG. 3, push-button 80 is fitted with three vertical-aligner pins 81 that extend laterally into vertical tracks, two of which are shown by dashed lines 82 in FIG. 1, formed in receptacle 24. The pins are received in the tracks to ensure that the pushbutton will move only vertically.

Figure 4:
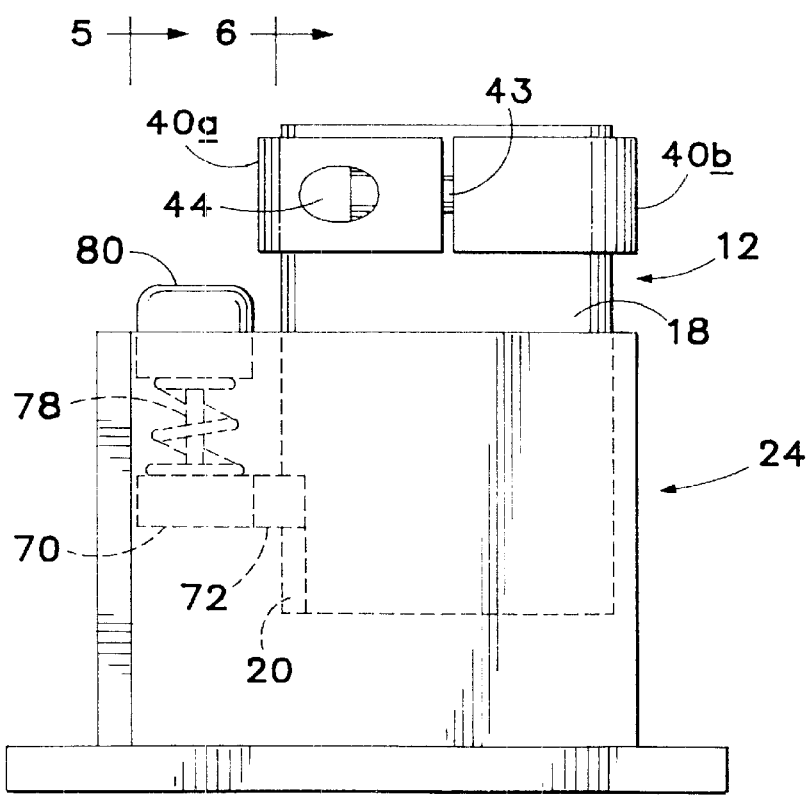
FIG. 4 is a side elevational view of the receptacle.

The reader can understand the locking mechanism by first viewing protrusion 72 extending into space 22 as shown in FIGS. 3–4, and then viewing recess 20 in outer surface 18 of joining structure 12 as shown in FIG. 1. Next, referring to FIG. 6A, there is shown protrusion 72 in a first position blocking upward movement of joining structure 12. Protrusion 72 is movable to this first position by inserting joining structure 12 into receptacle 24 with sloping edge 12a glidably moving along angled surface 72a. Because bar 70 (and thus protrusion 72) is spring-loaded with respect to horizontal movement in open section 74 of receptacle 24, downward movement of joining member 12 will cause gliding movement between sloping edge 12a and angled edge 72a. Such gliding movement will cause bar 70 to move laterally against spring-loaded tension until joining structure 12 is inserted completely into space 22. At this point, which is depicted in FIG. 6A, sloping edge 12a will be positioned below angled surface 72a, which allows protrusion 72 (and bar 70) to spring laterally into curved edge 12b. With protrusion 72 movable to the first position shown in FIG. 6A, joining structure 12 is locked in receptacle 24 because the protrusion prevents upward movement of the joining structure out of the receptacle.

Referring to FIGS. 5B–6B, it will be understood that the locking mechanism may be unlocked by pushing down on pushbutton 80. When pushbutton 80 is pushed down, wedge 78 will force bar 70 to move laterally such as to the right in open section 74 as shown in FIG. 5B. Referring to FIG. 6B, such movement of bar 70 will cause protrusion 72 to move to the right in the direction of arrow 88, thereby allowing joining structure 12 to be moved upwardly in the direction of arrow 90. Such upward movement is possible because protrusion 72 will no longer be in the first position shown in FIG. 6A, but will instead be in the second position shown in FIG. 6B where it is out of blocking position with curved edge 12b of joining structure 12.

An application of the invention is, as described above, in the passenger cabin of an airplane, where flight attendants can distribute the plugs and attached electronic devices to passengers who desire them. Receptacles 24 typically are located in all, or at least several, of the seats in the passenger cabin, but the devices often are only distributed to a subset of the seats having receptables 24, and the devices typically are stowed during takeoff and landing. Thus, many of the receptacles, and all of the receptacles during a portion of the flight, have no plug inserted therein, and such receptacles are susceptible, although they may nominally be covered with a flip-top lid or other protective covering, to fouling with all manner of debris that passengers may insert or drop into the receptacles.

When a plug is inserted into a receptacle, there is a danger therefore that conductor 32 may be jammed by debris and/or collide with the debris, thus breaking, bending or otherwise damaging pins or other contacts of conductor 32 or jack 14. Even in the absence of debris, if plug 10 is inserted in a non-aligned manner, then the pins or jack likewise may be damaged.

Figure 7:
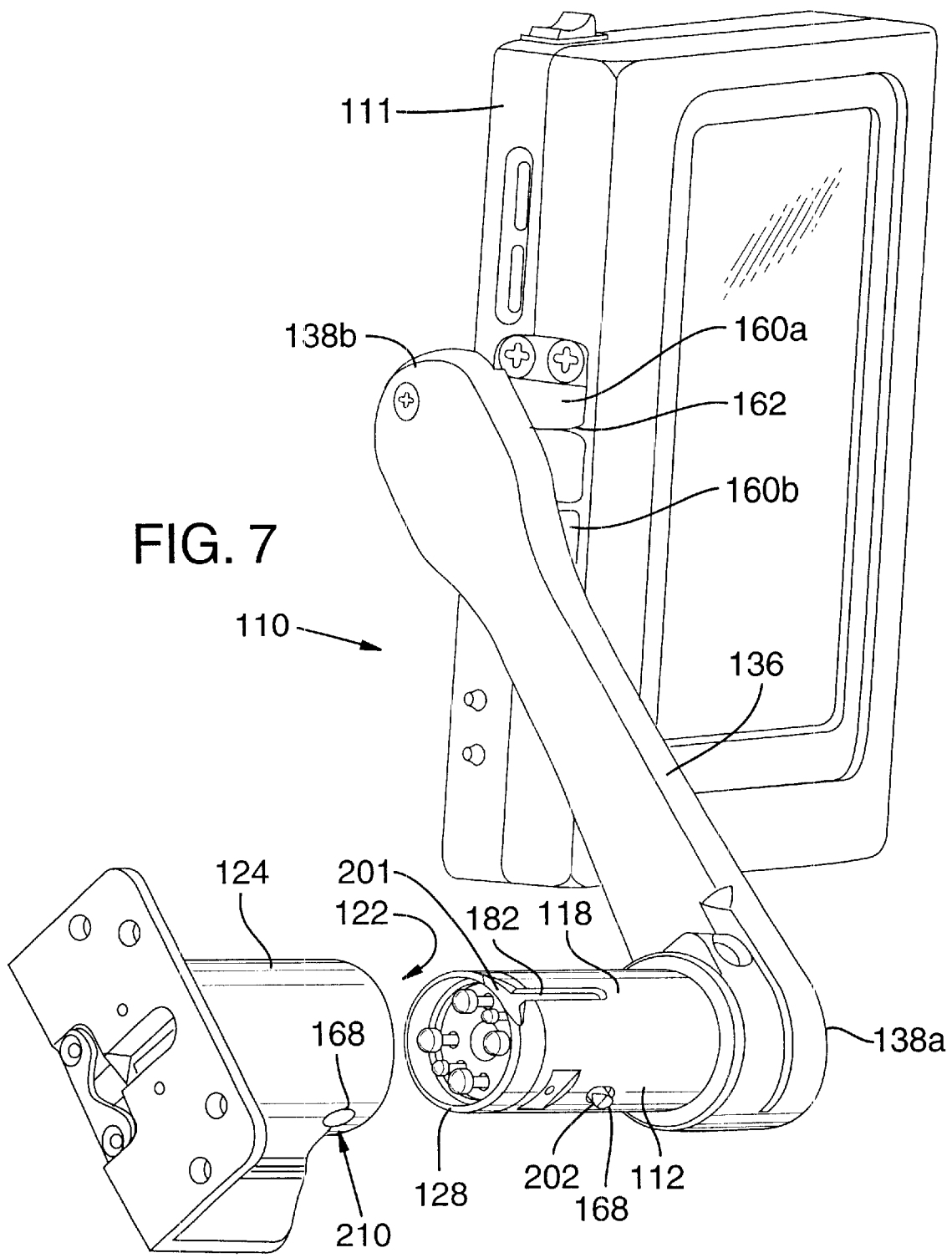
FIG. 7 is an isometric view of a plug and receptacle, the plug including retractable pins or contacts biased to a nominally extended position, and a projecting structure, coupled to the plug, which supports a flat screen television, the plug and its portion of a locking mechanism and an alignment guide being shown in an exploded-style aligned for mechanical connection to the receptacle.

An alternative embodiment of the invention is shown in FIGS. 7–13, with reference numerals in the 100's corresponding to numerals below 100 for the previously described embodiment where applicable. The alternative embodiment includes many of the features of the previous embodiment plus some additional features. As shown in FIG. 7 an articulating projecting plug, indicated generally at 110, supports a flat-screen television 111 in a tilt bracket 162, and plug 110 is configured for connection to a receptacle 124 that is typically mounted in the arm of an aircraft seat (see FIGS. 1 and 2). An elongate projecting structure 136 having first and second ends 138a and 138b is rotatably coupled at second end 138b to tilt bracket 162. First end 138a typically is pivotally coupled to a joining structure 112.

Plug 110 includes one-half of a locking mechanism 168 for releasably holding together joining structure 112 and receptacle 124, which includes the other half of locking mechanism 168. A latch 202 on joining structure 112 includes a sloping face 204 (FIG. 12) and a hinge 206 coupled to a control rod 208. As joining structure 112 is inserted into interior cavity 122 of receptacle 124, sloping face 204 contacts the rim of receptacle 124 causing latch 202 to rotate upwardly and inwardly on hinge 206 and to swing clear to allow insertion of joining structure 112 into receptacle 124. When joining structure 112 is inserted to the proper depth for electrical and mechanical connection, latch 202 pops out through a hole 210 in receptacle 124, thus locking the joining structure into place, as shown in FIG. 13. Hole 210 is also shown in 10.

Locking mechanism 168 is released either by pulling up on a knob 212 atop control rod 208 to rotate latch 202 clear of the wall of receptacle 124 or by directly pushing from the outside of receptacle 124 on latch 202 to clear the latch of the edge of hole 210, either method allowing the joining structure 112 to be removed from receptacle 124. Knob 212 allows removal of joining structure 112 without the passenger's having any contact with receptacle 124, thus allowing the receptacle to be minimally accessible from outside of seat arm 26 to lessen the likelihood of debris or other material falling into seat arm 26. For example, only opening 122 may be accessible from outside seat arm 26, with no access to the area surrounding receptacle 124.

As shown in FIG. 7, joining structure 112 includes an alignment guide or insertion key, such as vertical track 182 with a delta-shaped opening 201 which mates with corresponding structure within receptacle 124, similar to the vertical aligner pins 81 shown in FIGS. 3, 5A and 5B. Track 182 and the corresponding structure allow insertion of joining structure 112 only in the proper orientation for connection of corresponding electrical contacts to be described below and they promote exact alignment of the contacts for an optimal electrical connection.

Figure 8:
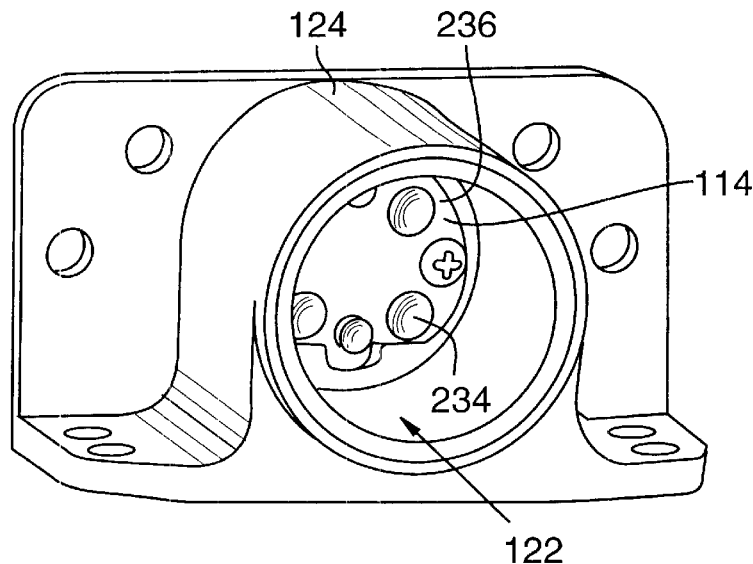
FIG. 8 is an isometric view of the receptacle of FIG. 7 showing a circuit board attached by screws to the receptacle, the circuit board including terminals provided by conductive pads that are plated on the circuit board, and showing mounting holes for attaching the receptacle to a structure.
Figure 9:
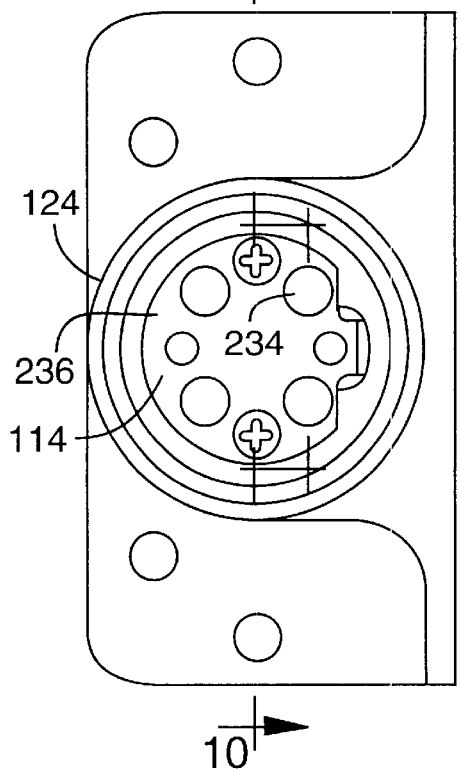
FIG. 9 is a top plan view of the receptacle showing the circuit board, the associated conductive pads, and the mounting holes for attaching the receptacle to a structure.

As shown in FIGS. 7 and 11–13, joining structure 112 includes a mating structure, such as outer surface 118 and receptacle 124 includes a mating structure such as inner cavity 122 (FIGS. 7–10 and 13) which assist in providing a mechanical connection between joining structure 112 and receptacle 124. As shown in FIGS. 8 and 9, inner cavity 122 of receptacle 124 is typically generally cylindrical in shape, and jack 114 is disposed at a lower end of cavity 122. As best seen in FIG. 13, outer surface 118 is fitted into cavity 122, thus providing lateral support of joining structure 112 by receptacle 124. The mechanical connection, including lateral support, can be provided in other manners as well, including but not limited to the joining structure having an inner cavity for mating with an outer surface of the receptacle, or other suitable means.

As shown in FIGS. 12 and 13, conductors 132 have first ends 132a that are coupled by conventional means, such as wire wrapping or insertion in a wire-retention slot, to a coupler 214, which may be provided, e.g., by the test probes known under the name Pogo®, produced by the Everett Charles Technologies company of Pomona, Calif., typically Model No. SPA-4J-1 or other suitable probe. The 2000 Pogo® Contacts catalog published by Everett Charles Technologies is hereby incorporated by reference.

Each coupler 214 typically has an elongate shape and defines a longitudinal axis A. Coupler 214 includes a hollow cylindrical body 216 that is anchored in holder 134 by suitable means, e.g., by a press ring on the outer surface of cylindrical body 216 that prevents movement of body 216 in holder 134. However, couplers 214 can be easily removed and replaced in holder 134 by hand, or with an extraction tool and/or an insertion tool. Coupler 214 may also include an outer sleeve, referred to as a receptacle in the Pogo catalog, anchored in holder 134 and in which body 216 is held.

A wire attachment means 218, e.g., a square post for wire-wrapping, is provided at an upper end 220 of cylindrical body 216. A plunger or piston 222 is disposed partly within cylindrical body 216, and is selectively movable between an extended position, shown in solid line in FIG. 12, and a retracted position, shown in dashed line in FIG. 12. Piston 222 is generally cylindrical and fits within the inner diameter of cylindrical body 216 and both piston 222 and body 216 are coaxial with longitudinal axis A of coupler 214.

Piston 222 includes a distal end 224 that extends out of a distal end 226 of cylindrical body 216. Distal end 224 of piston 222 culminates in a tip, such as head 228 that provides a contact 230, that provides a surface area of generally hemispherical configuration as shown in FIGS. 7, 11, and 12, although any shape, including flat or partially spherical, i.e., less than 180° of arc, can be used. Contacts 230 are electrically connected through respective pistons 222 and cylindrical bodies 216 to conductors 132.

A bias, such as spring 232 nominally biases each piston 222, and thus each contact 230 to the extended position. Each contact 230 is selectively movable along longitudinal axis A toward the retracted position. Contacts 230 are designed to provide an electrical connection to jack 114 having corresponding electrical terminals, such as conductive contact pads 234, that are plated on a circuit board 236 mounted in receptacle 124.

Receptacle 124, as best seen in FIGS. 8 and 9, may include a plurality of terminals as required to make the necessary electrical connections between the electronic signal ports and electronic device 111. For example, FIGS. 8 and 9 show six terminals 234, which can accommodate power and ground, audio/visual signal and return, and a duplexed control/status signal and return for channel-selecting, volume, and other control functions on the electronic device and reporting channel and other control function status to the electronic device.

Figure 10:
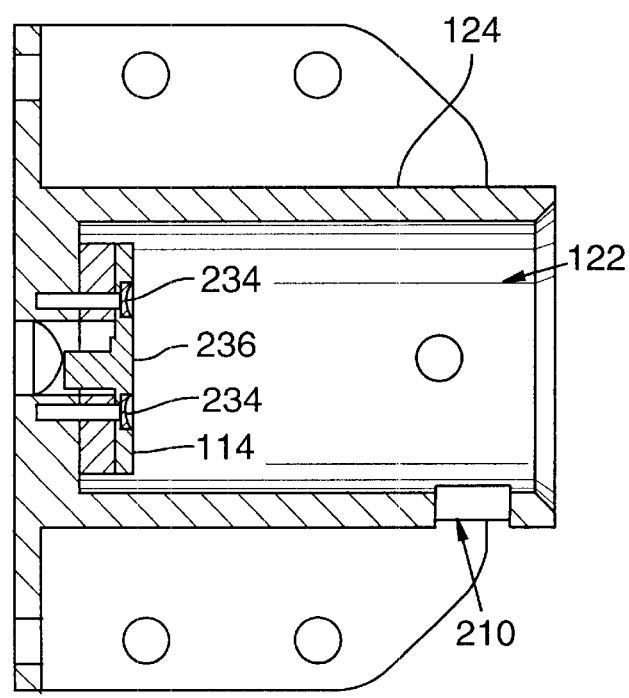
FIG. 10 is a cross-sectional side view of the receptacle showing the circuit board and the receptacle's portion of the locking mechanism.

Typically contacts 230 and terminals 234 are provided with a complementary shape. For example, as shown in FIGS. 10, 12, and 13, contacts 230 have a convex, hemispherical shape and terminals 234 have a concave, hemispherical shape. Alternatively, the complementary shapes could both be flat, or any other pair of complementary shapes, although a complementary shape is not required, and any shape for the contacts and terminal providing an adequate electrical connection can be used.

Operation

From the above description, and referring to FIG. 1, it should be apparent that articulable projecting plug 10 of the present invention is usable to make a mechanical connection between an electronic-signal port such as jack 14 and housing/support structure 50 which is associated with an electronic/avionic device such as television 11. Plug 10 also accommodates electronic communication between a signal source (undepicted) and television 11 by establishing contact between first end 32a of conductor 32 and jack 14, with conductor 32 being connectable via its second end 32b to television 11.

Still referring to FIG. 1, once mechanical connection is made and electronic communication exists between the source and television 11, plug 10 is articulable in the direction of arrows 46 in a pivot plane. The user can also move television 11 in a plane that is different from the pivot plane by moving tilt bracket 62 in the direction of arrows 92 in FIGS. 1 and 2.

Referring to FIGS. 1–2 and 5A–6A, the user locks plug 10 in receptacle 24 by inserting joining structure 12 into space 22. Referring to FIG. 6A, such movement causes protrusion 72 of bar 70 (FIG. 5A) to move to a first position blocking upward movement of sloping edge 12a thus blocking upward movement of joining structure 12.

Referring to FIGS. 5B and 6B, the user unlocks plug 10 from receptacle 24 by pushing downwardly on pushbutton 80 which causes wedge 78 to move downwardly, thereby moving bar 70 laterally against spring-loaded tension. Such movement of bar 70 causes protrusion 72 to move to a second position shown in FIG. 6B. The second position is out of blocking engagement with sloping edge 12a, with the result being that joining member 12 can be moved upwardly and out of receptacle 24 in the direction of arrow 90.

It should be appreciated that receptacles like receptacle 24 could be placed in desired arms of aircraft-passenger seats (like arm 26) and plug 10 could be easily interchangeably mounted in any one of such receptacles to establish communication with an associated signal port (like jack 14). In this way, plug 10 could be used by airline companies to offer individual television service to customers.

As shown in FIG. 13 contacts 230 on joining structure 112 and terminals 234 on receptacle 124 are configured to provide an electrical connection when joining structure 112 is inserted in receptacle 124 to a depth sufficient so that contacts 230 come into contact with terminals 234. More particularly, as joining structure 112 is inserted in receptacle 124, with contacts 230 nominally biased to the extended position, contacts 230 initially contact terminals 234 at a relative position, and as joining structure 112 is further inserted in receptacle 124 to the locked position shown in FIG. 13, contacts 230 retract relative to joining structure 112 along longitudinal axis A and contacts 230 and terminals 234 remain fixed in the relative position established at contact. That is, the contacts do not wipe against one another as in a conventional plug and jack.

It will be understood that due to tolerances in the mating of joining structure 112 and receptacle 124 that the contacts may move small amounts relative to one another. For example, if a contact 230 having a hemispherical shape is inserted initially slightly off-center with the corresponding concave terminal 234, then a small amount of play in coupler 214 and in its connection to holder 134 allow contact 230 to move slightly and seat in terminal 234. However, the meaning of fixed in the relative position encompasses such small movements.

As shown in FIG. 13, one of contacts 230 has made a direct electrical connection with the corresponding terminal 234 and contact 230 is retracted from the extended position, but the other contact 230 has collided with a piece of debris 238 that is resting on terminal 234, and this contact 230 is retracted farther toward the retracted position than the contact 230 that is making direct contact. The debris-blocked contact 230 may or may not make electrical contact with terminal 234, and alternative configurations for contact 230 may be used, e.g., multiple sharp points to pierce through contamination, but in any case, contact 230 is not damaged or permanently pushed out of position by the debris, as would be the case for a typical connector pin.

Contacts 230, when retracted from the extended position are biased by spring 232 toward the extended position, thus providing a contact force to improve the electrical connection with terminals 234. Contacts 230 provide a hemispherical or, alternatively, a partially spherical, elliptical, or a flat, circular surface area for a broad area of contact with the corresponding pads on the receptacle. The broad area and the complementary shapes allow for greater tolerance in alignment of the joining structure and receptacle, because the contacts do not need to be lined up with the same degree of accuracy as is required for conventional pins that must be inserted in sockets in conventional connector terminations.

Retractable contacts 230 may alternatively be provided on the receptacle, or on both the joining structure and the receptacle. Also, the retractable feature of the contacts may be provided by other means, e.g., a deformable conductive pad, or a flexible wire held at two points for contact between the two points with another wire held between two points, or any other means by which the contacts remain fixed in a relative position established at initial contact.

While the present invention has been shown and described with reference to the foregoing preferred embodiment, it will be apparent to those skilled in the art that other changes in form and detail may be made therein without departing from the spirit and scope of the invention as defined in the appended claims.

I claim:

1. A connector arrangement for providing a mechanical and an electrical connection, the connector arrangement comprising:
   a receptacle having a plurality of electrical terminals;
   a joining structure configured to be mechanically connected to the receptacle; and
   a plurality of couplers, each coupler including a body removably attached to the joining structure and an electrical contact movably coupled to the body, wherein each coupler body and the joining structure are configured for extraction of each coupler body from the joining structure separate from extraction of each other coupler body,
   wherein each of the electrical contacts and a corresponding one of the terminals provide an electrical connection therebetween, when the joining structure and receptacle are mechanically connected, each electrical contact moving from an extended position toward a retracted position as the mechanical and electrical connections are made.

2. The connector arrangement of claim 1 wherein the coupler bodies are generally cylindrical.

3. The connector arrangement of claim 1 wherein the coupler bodies are substantially hollow.

4. The connector arrangement of claim 1 wherein the coupler bodies define longitudinal axes, the body axes being spatially separated from one another.

5. The connector arrangement of claim 1 wherein each coupler includes a piston defining a proximal end and a distal end, wherein the proximal end is movably disposed within the coupler body, and wherein the electrical contact is disposed on the distal end of the piston.

6. The connector arrangement of claim 5 wherein the distal end includes an enlarged, generally hemispherically-shaped head providing the electrical contact.

7. The connector arrangement of claim 1 wherein the electrical contact is generally hemispherical.

8. The connector arrangement of claim 7 wherein the terminal has a convex, generally hemispherical shape.

9. The connector arrangement of claim 1 further comprising a locking mechanism for releasably holding together the joining structure and the receptacle.

10. The connector arrangement of claim 1 wherein one of the joining structure and the receptacle include an alignment track having a delta-shaped opening.

* * * * *